Nov. 8, 1927.
F. N. VANIER
1,648,205
CONVERTIBLE VEHICLE BODY
Filed Dec. 12, 1924 2 Sheets-Sheet 1
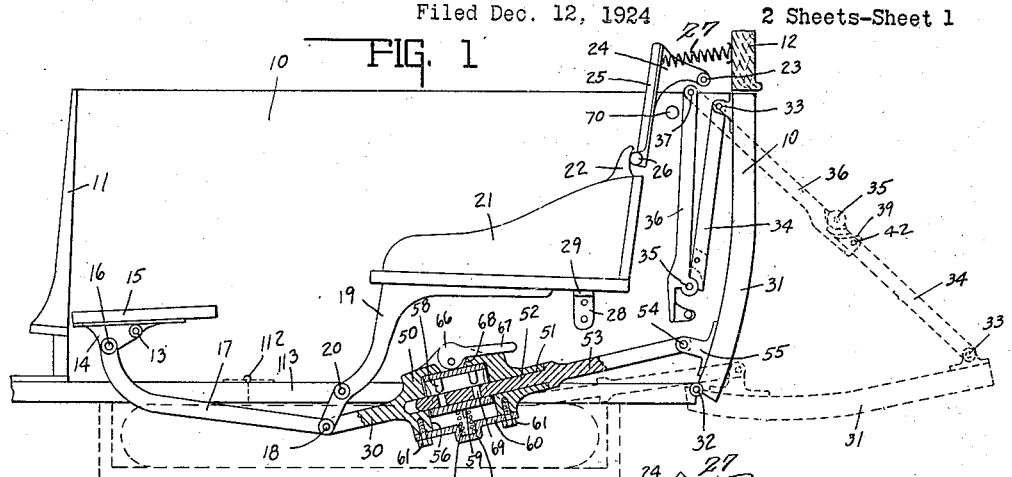
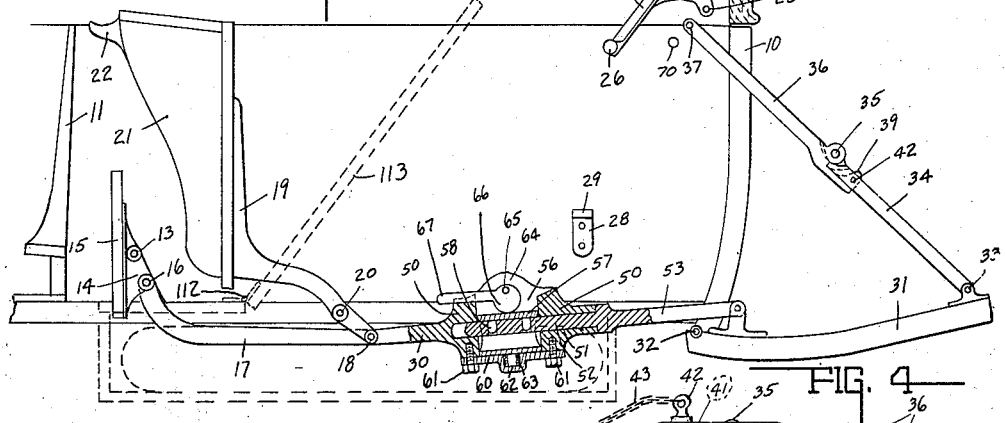
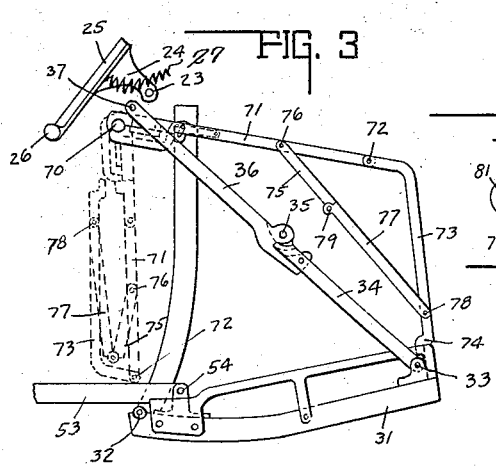
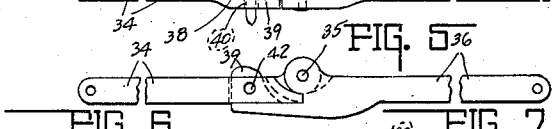
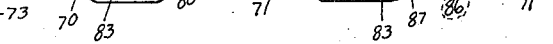
INVENTOR.
FRANCIS N. VANIER.
BY
ATTORNEYS.

Nov. 8, 1927.
F. N. VANIER
1,648,205
CONVERTIBLE VEHICLE BODY
Filed Dec. 12, 1924    2 Sheets-Sheet 2
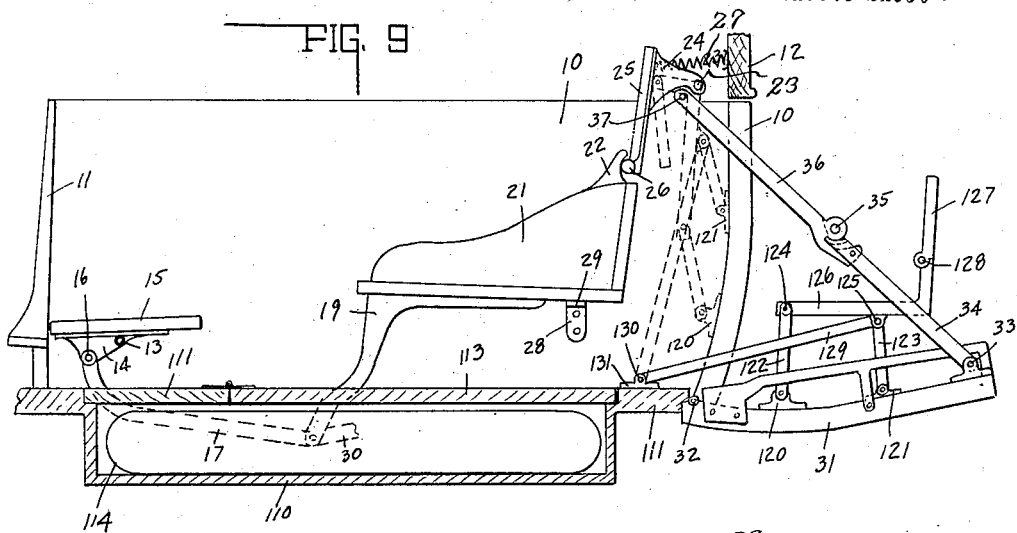
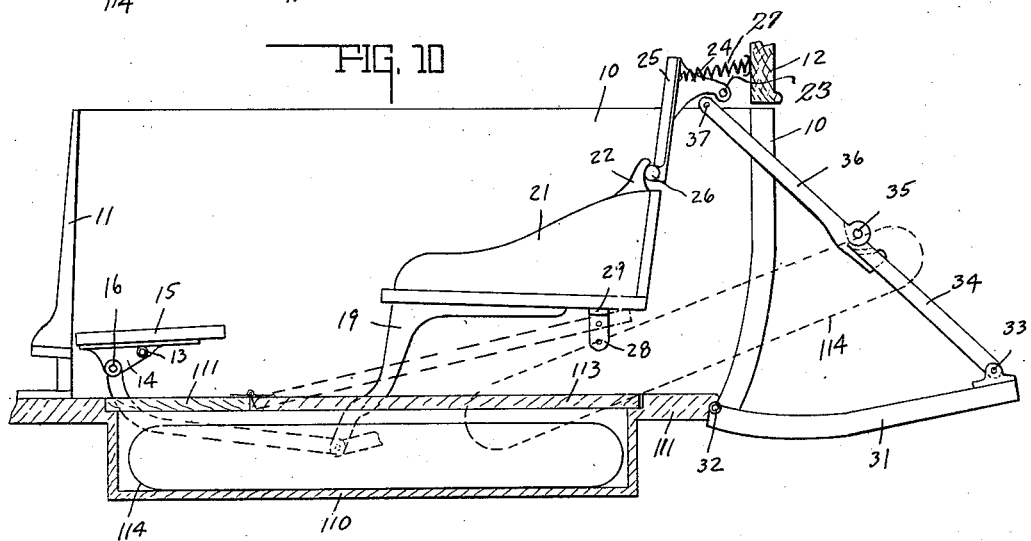
INVENTOR.
FRANCIS N. VANIER.
BY
ATTORNEYS.

Patented Nov. 8, 1927.

1,648,205

UNITED STATES PATENT OFFICE.

FRANCIS N. VANIER, OF INDIANAPOLIS, INDIANA.

CONVERTIBLE VEHICLE BODY.

Application filed December 12, 1924. Serial No. 755,454.

This invention relates to a vehicle body of the general character described in my prior Patent No. 1,441,388, dated January 9, 1923.

The chief object of the invention is to improve the vehicle body disclosed in the before mentioned patent and in addition provide additions thereto as will appear more fully from the drawings and following description.

The chief feature of the invention consists in the universal adjustability and transformation of the vehicle body disclosed herein for the several purposes desired.

Other features of the invention include improved means for supporting a combination tail-gate and back, an improved seating arrangement, and an improved selective locking and actuating construction interposed between the seat and the combination back and tail-gate, all of the foregoing broad features of the invention being disclosed in the before mentioned patent.

An additional feature to the foregoing consists in the provision of an auxiliary seat adjustable or tiltable into a non-interfering position simultaneously with the tilting of the rear seat into inoperative position.

Another feature of the invention consists in the addition of a canopy framework which is carried in collapsed relation between the back and the seat when the foregoing are normally positioned, but which can be moved into canopy supporting position if and when desired when the combination back and tail-gate is in the tail-gate forming position or maybe detached completely.

A further feature of the invention consists in the positioning of a storage compartment beneath the floor of the vehicle and providing access thereto from without by lowering the tail-gate and passing beneath the seat or from within the vehicle by tilting the seat into inoperative position.

Another feature of the invention consists in the mounting of a rear seat on the tail-gate.

The full nature of the invention will be understood from the accompanying drawings and the following description and claims:

In the drawings Fig. 1 is a central sectional view of the rear end of a vehicle body equipped with the invention, the full lines indicating the normal position of the several parts and the dotted lines indicating another and desired position of some of the same parts, other parts being broken away and shown in section to show still other parts in detail. Fig. 2 is a view similar to Fig. 1 but illustrates the parts in what may be termed the bed or truck forming position. Fig. 3 is a similar view of a portion of the parts in Figs. 1 and 2, and of a canopy framework attachment to the foregoing and the preferred form of the invention and in the two positions. Fig. 4 is a top plan view of the hinged support for the tail-gate. Fig. 5 is a side elevational view thereof. Fig. 6 is a side elevational view of the lock associated with the pivotal support of the canopy framework showing the parts in non-locking position. Fig. 7 is a similar view of the same parts showing the parts in the pivot locking position. Fig. 8 is a transverse sectional view taken on line 8—8 of Fig. 7 and in the direction of the arrows. Fig. 9 is a central sectional view of a modified form of the invention and also illustrates in detail one feature of the invention indicated generally in Figs. 1 and 2. Fig. 10 is a view similar to Fig. 9 of the tire receiving compartment showing a method of removing the tire therefrom.

In the drawings there is illustrated a vehicle framework of any suitable character and herein indicated by the numeral 10, which supports the usual front seat 11 and the back 12. Adjacent the front seat 11 and upon pivots at each side of the body 10, which pivots are indicated by the numeral 13, are the combination lever brackets 14, which support an auxiliary seat 15. The lever bracket 14 is pivotally connected at 16 to a link 17, which link 17 is pivotally connected at 18 to another pivotally supported bracket 19, pivotally supported at 20 upon the same framework or body 10. The two brackets 19 support a rear seat construction 21, which at each side and at the upper rear edge, includes a catch 22. Pivotally supported at 23 adjacent each side the body 10, is a bracket 24, which supports a head and back rest 25. The back rest 25, as herein disclosed, has an extension of the bracket 24, which includes a pin 26 which lies behind the catch 22, whereby the seat 25 is normally maintained by said catch 22 in the seat forming position. A tension spring 27 is interposed between the back rest 25 and the back 12 and normally tends to move and maintain the back rest 25 in the position shown in Fig. 2. At each side, the body also includes a suitable bracket 28 with a lateral portion 29 that supports the seat 21 when in seat forming position. A suitable link 30 is connected to the lever 19 and the link 17 at the pivot 18, and is adapted to actuate the levers 19 and 14 for moving simultaneously the seats 15 and 21 into the position shown in Fig. 2. Movement of the seat 21 from the position shown in Fig. 1 to the position shown in Fig. 2 as aforesaid, permits back rest 25 to be moved into position shown in Fig. 2, by means of the spring 27.

The back 12 includes a panel or back portion 31, which is pivotally supported near its lower edge at 32 by the body 10 and at each side of said rear panel. The upper end of the panel, and herein at 33, is connected to one end of a hinged link 34 that is hingedly connected at 35, to another link 36, hingedly supported at 37 upon the body 10. As shown clearly in Figs. 1, 2, 4 and 5, one of the links, herein 34, is shown provided with a slot 38 adapted to receive a tongue 39 carried by the other link, and herein the link 36. The link including the slot 35 includes a transverse and communicating aperture 40 and the tongue includes a registering aperture 41. The link 34 carries a pin 42 which is seatable in the registering apertures 40 and 41, and serves to lock the tongue in the slot, and thereby lock the two links together in the extended or suspended position. A suitable retainer 43 in the form of a chain or the like is adapted to permanently secure pin 42 to the linkage so that it will always be available for use. As shown clearly by the full lines in Fig. 1, linkage 34 and 36 can be collapsed into collapsed position, and when so collapsed the rear portion or panel 31 will be in the back forming position. When the linkage is extended as shown by the dotted line in Fig. 1 and the full line in Fig. 3, the same is in the tail-gate supporting and maintaining position.

It will be readily apparent that when the seat 21 is in the normal or seat forming position and the tail-gate 31 is in the lowered position shown clearly in Fig. 2, said tail-gate is adapted to support luggage or other paraphernalia such as camping equipment and the like. If desired, the tailgate may be maintained in the closed position as shown by the full line in Fig. 1, while the seat may be maintained in the inoperative position as shown in Fig. 2. When so positioned the aforesaid parts with the sides of the frame or vehicle body 10 form a compartment adapted to receive luggage or the like. When the parts are positioned as shown in Fig. 2, an elongated bed is provided including the base or bottom of the vehicle and the tail-gate 31. This position of the parts corresponds to the bed forming position and thus the vehicle may be used for sleeping purposes. The means for securing the aforesaid selective positioning as desired, consists of the adjustable linkage shown in section in Figs. 1 and 2. The adjustable linkage includes a housing 50 formed as herein shown integral with and upon a non-pivoted end of the link 30. The housing 50 includes a longitudinal slot or channel 51 therein adapted to receive a tongue 52 of a link 53 pivotally connected at 54 to a bracket 55 secured to the tail-gate 31 near the pivotal support thereof. The housing 50 in addition to the longitudinal slot includes a channel 56 which is adapted to slidably support a U-shaped locking member 57, the inner face of which carries a pair of locking pins 58 and the opposite face of which carries a projection 59. A cover plate 60 for the chamber 56 is suitably secured to the housing 50 as by the bolts 61 and includes a recess 62 adapted to receive a coil spring 63. The coil spring is not only receivable by the recess but is concentric with the projection 59, said projection serving as a spring retainer. It will be readily apparent that the U-shaped slidable locking member is normally maintainable in the position shown in Fig. 1 by a spring 63. Pivotally supported upon an ear 64 carried by the housing and at 65 is a cam 66, having a handle portion 67, which cam portion 66 is positionable in a slot 68 that communicates with chamber 56. It will be apparent that as shown from the position of the parts in Fig. 2 that the cam 66 is adapted to maintain the U-shaped retainer 57 in the lowermost position in chamber 56 in opposition to spring 63. Herein the tongue or extension 52 of the link 53 is shown provided with a pair of slots 69, which are adapted to register with the projections 58 or locking pins and thus lock the link 53 to the link 30 for simultaneous movement. The foregoing arrangement is utilized when it is desired to secure the parts in the bed forming position, as shown clearly in Fig. 2.

Whenever it is desired to carry luggage or other paraphernalia upon the tail-gate when the tail-gate is in the lowermost position or whenever it is desired to utilize the vehicle body herein disclosed for sleeping purposes and the like, or whenever it is desired to have the parts in the bed forming position so as to receive a greater load than the rear compartment of the vehicle normally would hold and yet protect that which projects or is positioned beyond the back of the vehicle, a flexible canopy is provided which is supported by a collapsible and detachable if desired, canopy supporting framework, which is shown clearly in Figs. 3, 6, 7 and 8. In Figs. 1, 2 and 3 there is disclosed a transverse support 70 which is positioned behind the back forming portion 25 of the rear seat and which does not interfere with the collapsibility and positioning of the supporting linkage 34 and 36. It will be understood that the canopy framework is herein disclosed as positioned within the two parallel positioned collapsible linkages 34 and 36 found at each side of the tail-gate 31. Herein the canopy framework comprises a link 71 which is pivotally supported upon the transverse support or pivot 70 by a construction shown in detail in Figs. 6 to 8 inclusive and which will be hereinafter more fully described. The link 71 is hingedly connected at 72 to a frame member 73. The frame member 73 has a suitable locking engageable end 74 for engagement with suitable means upon the upper end of the tail-gate 31. It will be understood that the two pairs of hinged parts 71 and 73 are suitably connected by transverse or suitable supporting means which may or may not be supported in an intermediate position by a similar construction including additional parts 71 and 73. For an understanding of the present invention, however, a plan view of the framework is believed unnecessary for intermediate construction may be varied to suit the convenience and desires of owner of the vehicle. To secure the hinged parts 71 and 73 in the desired or canopy forming position, a link 75 is pivotally supported at 76 upon the member 71 and a link 77 is pivotally supported at 78 upon the member 73, and said links 75 and 77 are pivotally connected at 79, so that the parts 71 and 73 will be maintained in the full line position shown in Fig. 3 when the linkage 75 and 77 is positioned in aligned relation. This type of hinged joint is quite common in folding rules, and therefore no further or detailed description thereof is believed necessary. When it is desired to collapse the canopy framework and fold the same into a position where it will not mar the appearance of the vehicle, the joint 79 is broken and the linkage 75 and 77 is drawn inwardly toward the back. At the same time the member 73 is elevated slightly if necessary by tilting upon pivot or hinge 72 to release the locking end 74 from the tail-gate. Thereafter the part 73 is tilted inwardly and toward the member 71, the member 71 also is tilted upon the transverse support 70 until the parts are positioned as shown by the dotted lines in Fig. 3. Thereafter the tail-gate 31 may be elevated into back forming position or may be left in the lowermost position and thereupon receive a trunk or other paraphernalia, which it is not desired to cover.

The particular detachable and lockable connection between the link 71 and the transverse support 70 is shown clearly in Figs. 6 to 8 inclusive. Herein the link 71 is shown provided with an elongated slot 80 adjacent the open pivotal support 81 adapted to engage the transverse portion 70. As herein disclosed the link 71 is provided with a cut-out portion 82. A U-shaped cross sectioned member (see Fig. 8) 83 having an extension 84 is positioned adjacent the before mentioned slotted portion of link 71 and the end 84 is turned inwardly through the slot or cut-out portion 82 so as to seat in the slot 80, and thus slidably support the member or catch 83 upon the link 71. The end of the member 83 is so formed as to complete the pivotal support of the open pivotal support 81. This is shown clearly in Fig. 7. When the parts are positioned as shown in Fig. 6 it will be readily apparent that the link 71 may be readily detached from the transverse support 70, while when the parts are positioned as shown in Fig. 7, the link 71 is locked to the transverse support 70 and pivotally supported thereon. The means for locking the slidable catch in the retaining or locking position consists of a pin 85 carried by the link 71, and a dog 86 having a locking tooth 87 for engagement with the opposite end of the slidable catch 83, which dog is pivotally supported at 88 on the link 71. Said locking dog 86 includes a slot 89 which receives pin 85 and this pin limits and determines the movement of the locking dog. A handle 90 may be provided if desired and consists of a pin carried by the locking dog 86.

As shown clearly in Figs. 1, 2, 9 and 10, the framework 10 includes a compartment 110, which includes a part of the floor 111 of said body 10 and the same hingedly supports at 112 a cover or floor 113. A tire 114 is receivable by this compartment and may be removed therefrom by lowering tail-gate 31 and elevating the cover 113 as shown by the dotted lines in Fig. 10 until the top of the cover engages the bottom of the seat 21 when the seat 21 is in the seat forming position. The tire 114 can thus be removed rearwardly without disturbing the occupants of the rear compartment of the vehicle. When, however, the back of the vehicle is loaded and it is inconvenient to remove the load from the tail-gate 31 to secure access to the tire from the rear of the vehicle, the seat 21 is tilted forwardly as shown clearly in Fig. 2, and the tire is removed upwardly and rearwardly from the rear compartment of the vehicle.

Reference will now be had to Fig. 9 and in this figure there is illustrated a modified form of the invention which includes a variation of the canopy framework, in the form of an additional or auxiliary seat. The tail-gate 31 carries a pair of pivot forming brackets 120 and 121. A link 122 and another link 123 are pivotally supported at one end by said brackets and at the opposite ends at 124 and 125 to a seat 126. The seat 126 is L-shaped and includes a back portion 127 hingedly connected thereto at 128 by a folding rule joint or equivalent construction, so that the portion 127 may be collapsed toward the seat 126 and yet be locked in the seat forming position by the joint or equivalent construction. When it is desired to maintain the same in seat forming position. A link 129 is also pivotally connected at 125 to the seat 126 and is pivotally connected at 130 to a bracket 131 upon the bottom of the rear compartment 111 or in similar position. Thus the essential construction of the rear seat is a parallelogram arrangement maintained in the seat forming position by the linkage 129 and collapsible upon the tilting of the tail-gate 31 into position adjacent said tail-gate as shown clearly by the dotted lines in Fig. 9. As shown clearly by the dotted lines in said figure, the auxiliary seat construction is positionable within the space formed by the rear seat 21 and the tail-gate 31.

The invention claimed is:

1. In a vehicle body the combination of a floor, a pivotally supported seat, a tail-gate pivotally supported adjacent the seat, a compartment positioned beneath the floor and extending forwardly of said seat and tail-gate respectively, said seat, tail-gate and compartment being so arranged that access to the compartment may be had when the tail-gate is lowered and beneath said seat or when the tail-gate is raised and the seat is tilted, an intermediate compartment formed by and between said tail-gate and said seat, and a collapsible compartment forming framework normally positionable in said intermediate compartment and movable rearwardly into extended relation and supportable by said tail-gate when in the lowered position to form another compartment.

2. In a vehicle body the combination of a vehicle framework, a tail-gate pivotally supported on its lower forward edge by the framework and movable rearwardly and downwardly from upright position into extended position, and a collapsible framework pivotally supported upon an axis parallel to the tail-gate axis and movable rearwardly and upwardly, the free ends of the tail-gate and collapsible framework lying immediately adjacent the pivoted ends of the collapsible framework and tail-gate respectively when in forward position, and the free ends of the tail-gate and collapsible framework being connected together when in rearward and extended position to form a compartment upon the rear of the vehicle framework.

In witness whereof, I have hereunto affixed my signature.

FRANCIS N. VANIER.